(12) United States Patent
Lim et al.

(10) Patent No.: US 7,611,007 B2
(45) Date of Patent: Nov. 3, 2009

(54) CONVEYER SYSTEM WITH AN OFFSET BUSH

(75) Inventors: Yee Min Lim, Singapore (SG); Jayagopi Muthiah, Singapore (SG)

(73) Assignee: Pteris Global Limited, Singapore (SG)

( * ) Notice: Subject to any disclaimer, the term of this patent is extended or adjusted under 35 U.S.C. 154(b) by 142 days.

(21) Appl. No.: 10/582,727

(22) PCT Filed: Oct. 7, 2004

(86) PCT No.: PCT/SG2004/000326

§ 371 (c)(1),
(2), (4) Date: Oct. 10, 2006

(87) PCT Pub. No.: WO2006/038881

PCT Pub. Date: Apr. 13, 2006

(65) Prior Publication Data

US 2007/0029166 A1    Feb. 8, 2007

(51) Int. Cl.
*B65G 17/06* (2006.01)

(52) U.S. Cl. .................. 198/853; 198/851; 198/850

(58) Field of Classification Search .......... 198/850, 198/851, 853, 370.04; 474/227–229, 233, 474/219–225, 230–231; 403/365, 367, 372; 384/276, 295
See application file for complete search history.

(56) References Cited

U.S. PATENT DOCUMENTS

| 2,181,659 | A | * | 11/1939 | Johnson ..................... 198/851 |
| 2,850,149 | A | | 9/1958 | Bankauf |
| 3,554,360 | A | * | 1/1971 | Bildsoe ..................... 198/833 |
| 4,050,323 | A | | 9/1977 | I'Anson |
| 4,493,680 | A | * | 1/1985 | Hoffmann ................... 474/230 |
| 4,864,975 | A | * | 9/1989 | Hasegawa ................. 123/48 B |
| 4,909,381 | A | | 3/1990 | Stohr |
| 5,141,379 | A | | 8/1992 | Warga |
| 5,407,061 | A | * | 4/1995 | Okada et al. ................ 198/812 |
| 5,667,054 | A | * | 9/1997 | van den Goor ......... 198/370.04 |
| 5,826,704 | A | * | 10/1998 | Van Den Goor ............ 198/851 |
| 6,131,724 | A | | 10/2000 | Hirasawatu |
| 6,241,080 | B1 | * | 6/2001 | Tuomikoski ................ 198/834 |
| 6,991,094 | B2 | * | 1/2006 | Frost ........................ 198/853 |
| 2003/0168323 | A1 | * | 9/2003 | Frost ........................ 198/852 |
| 2004/0245076 | A1 | * | 12/2004 | Grabmann ................. 198/850 |
| 2006/0039749 | A1 | * | 2/2006 | Gawehn ..................... 403/367 |

OTHER PUBLICATIONS

International Search Report for PCT/SG2004/000326, mailed Nov. 22, 2004.
International Preliminary Report on Patentability for PCT/SG2004/000326, completed Jan. 10, 2006.
Supplementary European Search Report for EP 04775647, mailed Nov. 10, 2008.

* cited by examiner

*Primary Examiner*—Gene Crawford
*Assistant Examiner*—William R Harp
(74) *Attorney, Agent, or Firm*—Howrey LLP; Viola T. Kung (57) ABSTRACT

A conveyor system is provided having a first pin (18); a first link block (11) carrying the first pin (18); a first offset bushing (17) on the first pin (18); and a second link block (11) carrying the first offset bushing (17), the second link block (11) movable with respect to the first link block (11) upon rotation of the first offset bushing (17) with respect to the second link block (11).

10 Claims, 15 Drawing Sheets

CONVEYER SYSTEM WITH AN OFFSET BUSH

This application is a National Stage of International Application PCT/SG2004/000326, filed Oct. 7, 2004, published Apr. 13, 2006, under PCT Article 21(2) in English.

FIELD OF THE INVENTION

The invention pertains to a drive chain mechanism for overlapping slat conveyors/carousels of closed loop or recirculating type having both horizontal and inclined portions. The drive chain loop is located and guided using guide wheels at a central track between two supporting load wheels running on the parallel rails. The drive chain loop is the main joining and driving component of the conveyor itself and is constructed using either 2-dimensional (2D) chain link assemblies or 3-dimensional (3D) curve chain link assemblies based on the type of conveyor i.e, conveyor having only horizontal curves (2D chains) or conveyor having both horizontal and vertical curves (3D chains).

BACKGROUND OF THE INVENTION

From U.S. Pat. Nos. 5,407,061 and 5,667,054, an overlapping slat conveyor with chain pitch adjustment using eccentric mechanism is known. These chain blocks are designed to cater for level slat conveyors having horizontal curves only. For multi-level slat conveyors which have to negotiate the level differences with vertical curves as well as horizontal curves to form a loop, a separate type of chain design is used as cited in U.S. Pat. No. 5,667,054. Also, this chain design is not truly multi-directional as the center of pivot axis of horizontal curve and vertical curve are not at the same point.

In a plant having both level as well as multi-level slat conveyors, usage of different type of chain blocks increases the inventory parts.

Also, the usage of slat conveyor having both horizontal as well as inclined portions is not possible with available chain design.

SUMMARY OF THE INVENTION

The present invention provides a conveyor system comprising a first pin (18); a first link block (11) carrying the first pin (18); a first offset bushing (17) on the first pin (18); and a second link block (11) carrying the first offset bushing (17), the second link block (11) movable with respect to the first link block (11) upon rotation of the first offset bushing (17) with respect to the second link block (11).

BRIEF DESCRIPTION OF THE DRAWINGS

For a more complete understanding of the present invention and the advantages thereof, reference will now be made to a conveyor diagrammatically illustrated in the accompanying figures, in which.

DETAILED DESCRIPTION OF THE INVENTION

Figure 1:
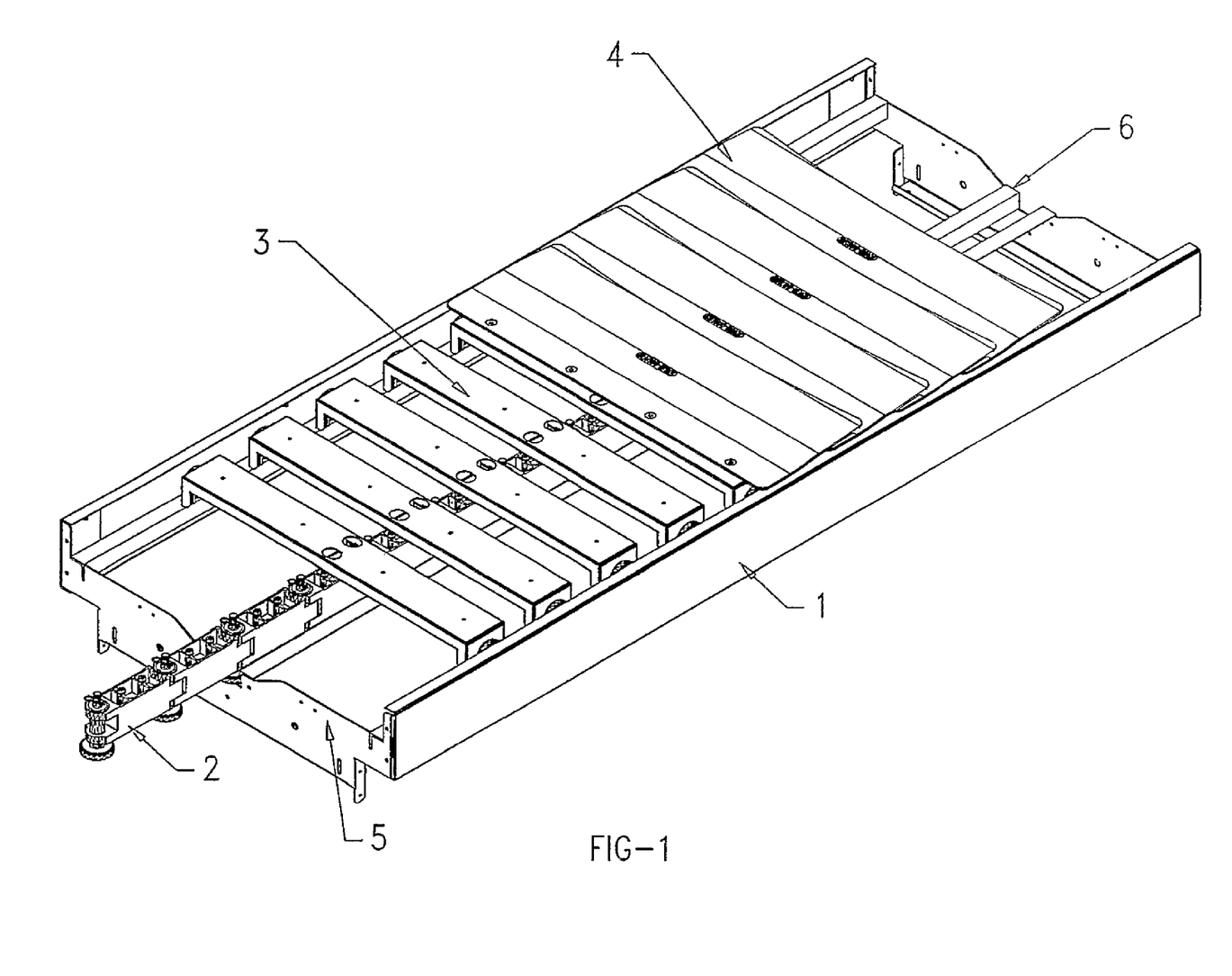
FIG. 1 is an isometric view of a part of a flat plane type overlapping slat conveyor/carousel.
Figure 2:
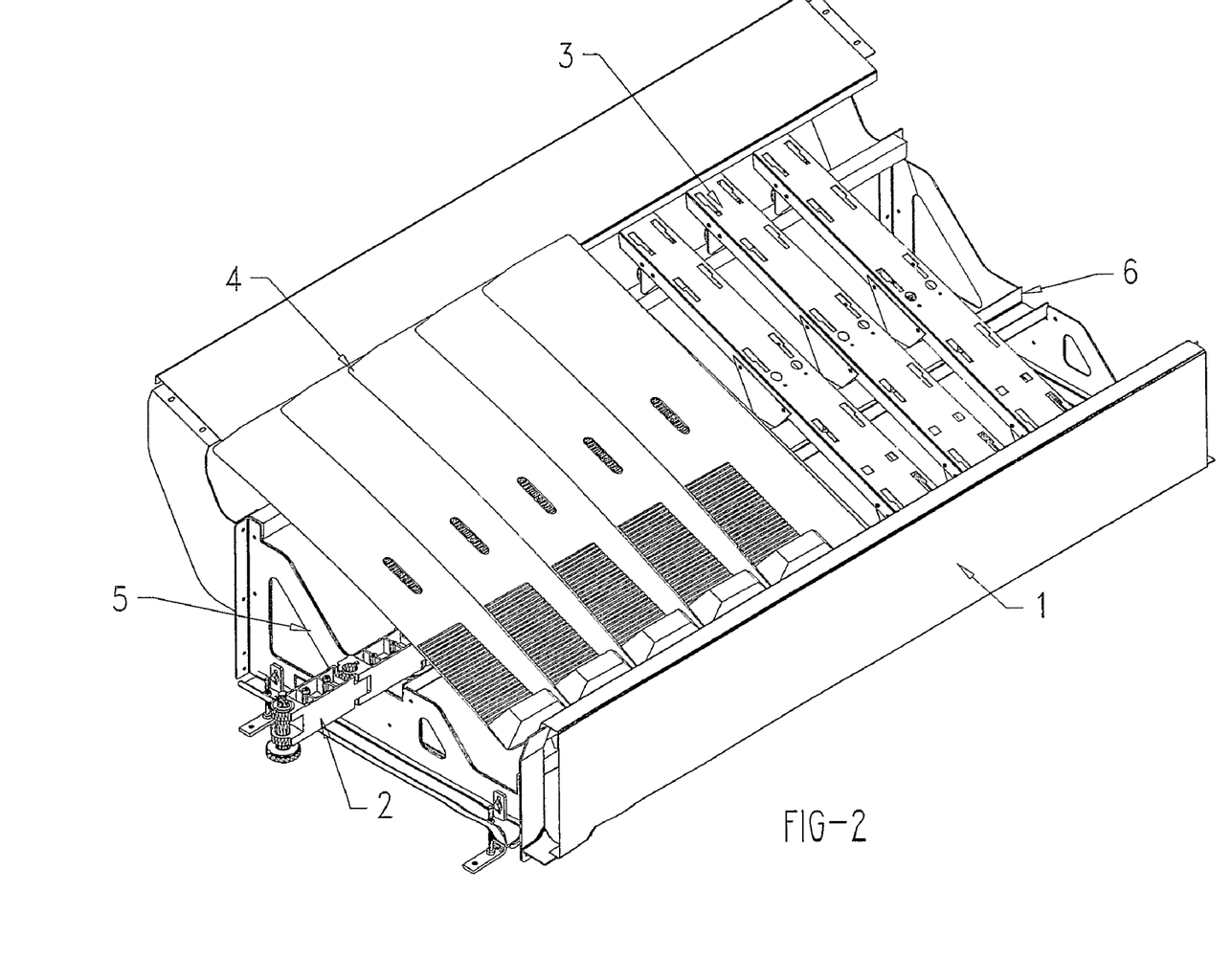
FIG. 2 is an isometric view of a part of an inclined plane type overlapping slat conveyor/carousel.
Figure 3:
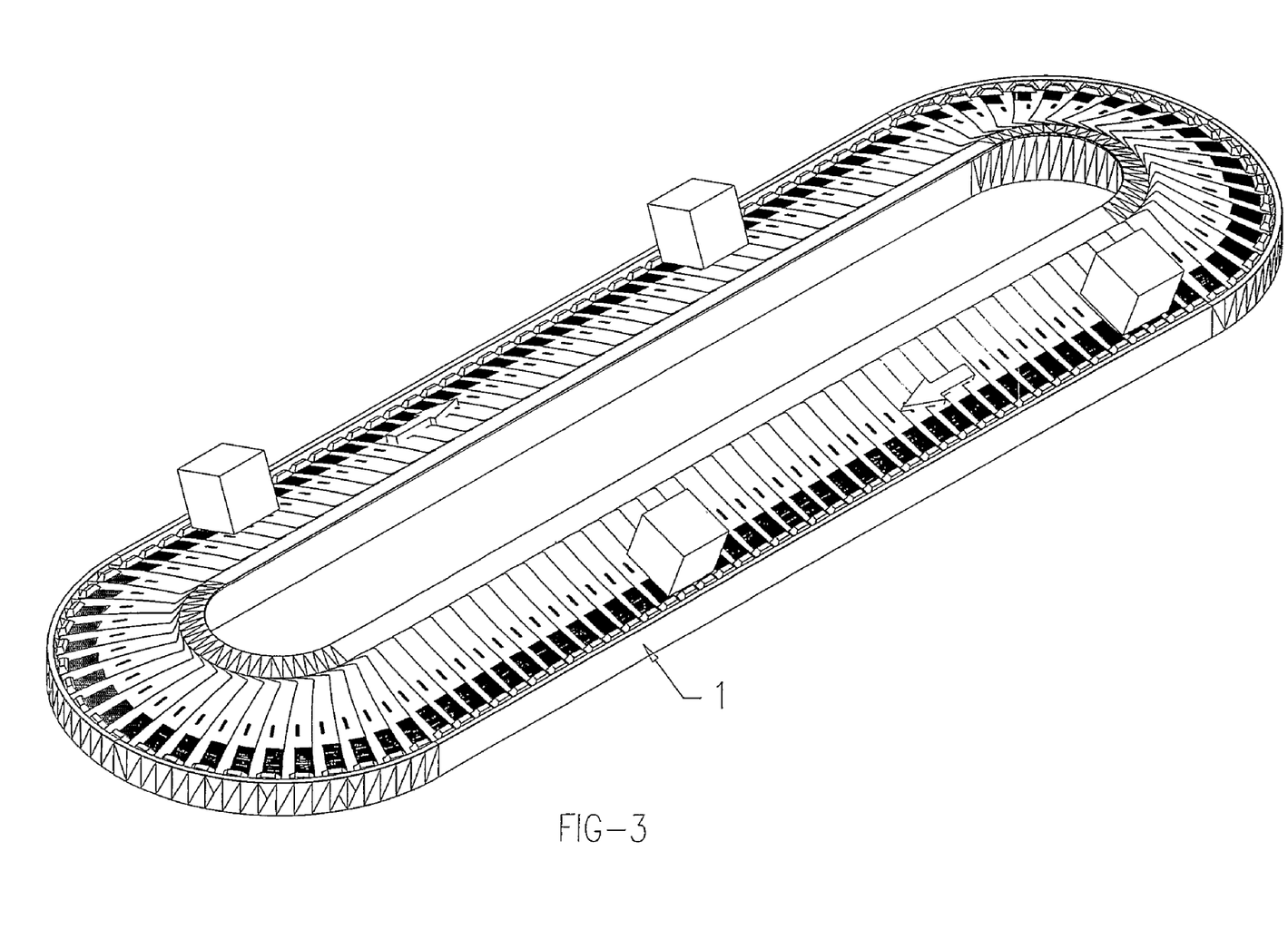
FIG. 3 is a view of an oval shaped inclined carousel loop.

Referring to FIGS. 1 and 2, there is shown a part of a conveyor system used as an overlapping slat conveyor/luggage carousel 1 as employed in-commercial airports. Carousel 1 can be a flat plane conveyor as shown in FIG. 1 or an inclined plane conveyor as shown in FIG. 2 running in a continuous loop following a curved travel path designed for the layout of the particular installation. For example, a common layout of luggage carousels is oval shaped, a typical arrangement is shown in FIG. 3.

Figure 4:
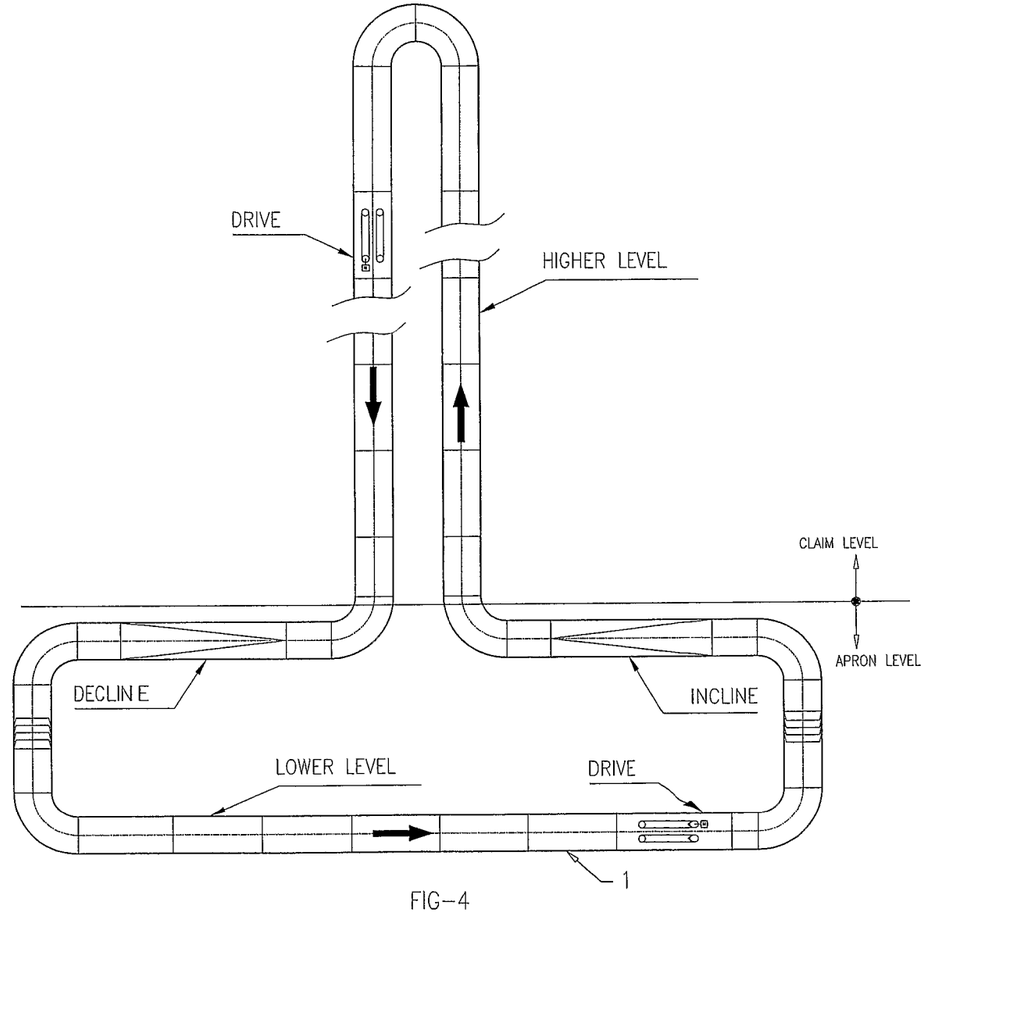
FIG. 4 is a view of a continuous loop running at different levels with convex and concave curve sections of a flat carousel.

The present invented design is equally suited to carousels including both convex and concave sections of travel as well as running at multi-levels in a continuous loop as shown in FIG. 4. For example, when the carousel has to be layout out at areas having different floor levels (e.g., apron area, bag claim area) or when the carousel has to be routed near roof levels by hanging and negotiating building beam depths, a multi-level design of the carousel becomes a necessity. The present invented chain assembly will meet these multi-level carousels requirements.

Also, removal of bags by passengers from the flat carousel is easier than that from an inclined carousel. However, the increase in bag size nowadays restricts the use of flat carousels at baggage claim area considering the passenger reach to the bags and safety. So, combining the flat and incline in a carousel will help in moving all bags to one side for easy removal of bags by passenger. In order to achieve this possibility, a true multidirectional chain assembly is required to be used and the invented chain assembly design meets this requirement also.

Referring to FIGS. 1 and 2, Carousel 1 consists of a series of individual planar rubber slats 4 forming an inclined or flat luggage-bearing deck, and each rubber slat 4 is removable attached to and supported by a respective steel slat support member 3 arranged for travel around a track defined by a supporting frame 5. Slat support members 3 are respectively attached to link blocks in chain 2 making up a continuous link block chain assembly, which is constrained to travel around a raceway 6 defined in frames 5. Chain 2 is driven by a friction type drive unit disposed within the frame 5 in a straight drive unit section of carousel 1.

Figure 5:
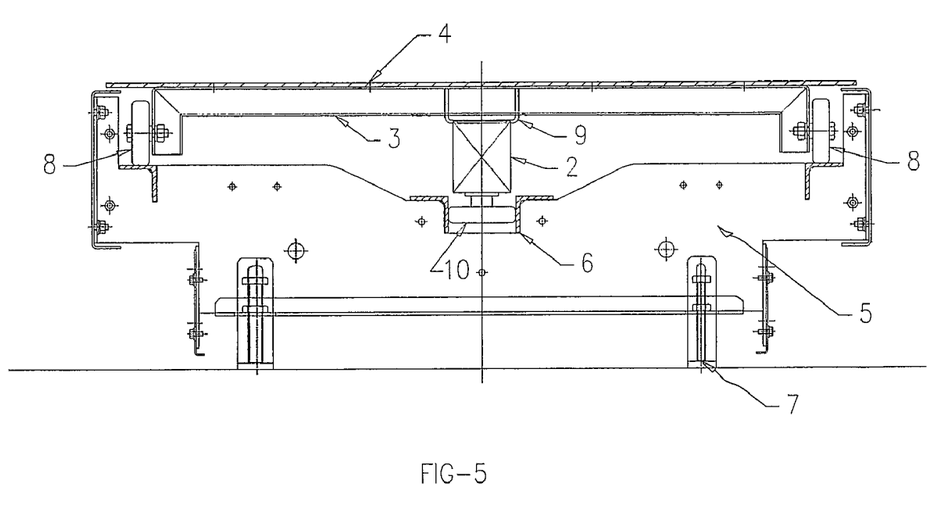
FIG. 5 is a sectional view of a flat plane carousel.
Figure 6:
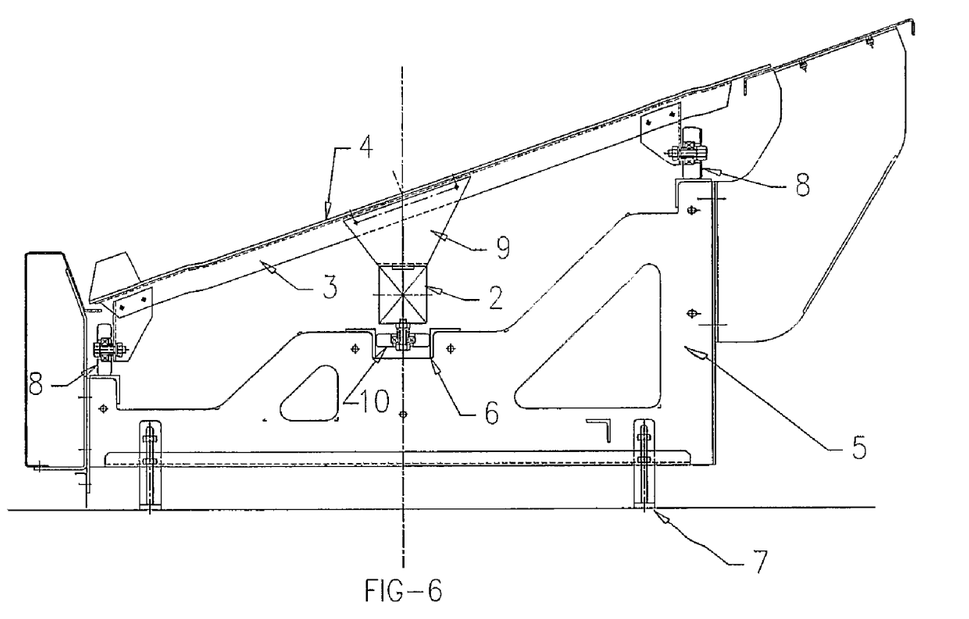
FIG. 6 is a sectional view of a inclined plane carousel.

Referring to FIGS. 5 and 6, Frame 5 is built up from a modular system of mild steel profiles, cross plates and side frame plates, all parts bolted together to form a complete framework of straight, curved and drive unit sections. Support elements for frame 5 are provided with adjustable footings 7 in order to level the frame during erection and to maintain the carousel at the appropriate height. Once carousel 1 is installed the framework on the passenger side is fitted with steel cover panels, rubber bumpers and kick plates, whilst the area enclosed by the carousel can be covered with an infill deck, if desired.

Each slat support 3 is supported by two outer load wheels 8 running on lateral rails provided by frame 5. Each slat support is mounted by way of slat support bracket 9 to a respective one of the link blocks 11 of the chain 2, each link block 11 mounted to float in central raceway 6 by means of a guide wheel 10. Raceway 6 is provided by a pair of steel rail profiles running around the entire length of carousel 1 and welded to frame 5. FIG. 5 and FIG. 6 illustrates more clearly the floating nature of the chain 2 along with guide wheel 10 in the raceway.

Figure 7:
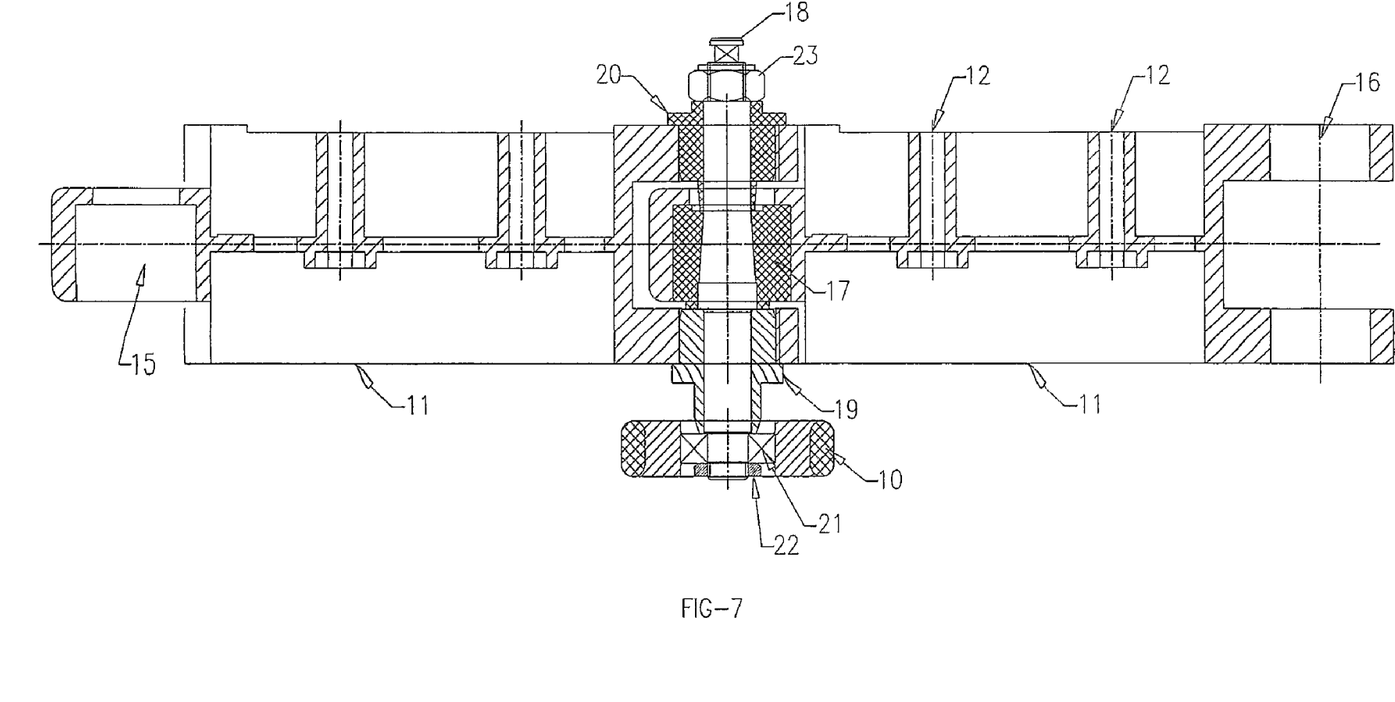
FIG. 7 is a sectional view of the 2-dimensional (2D) curve chain assembly.
Figure 8:
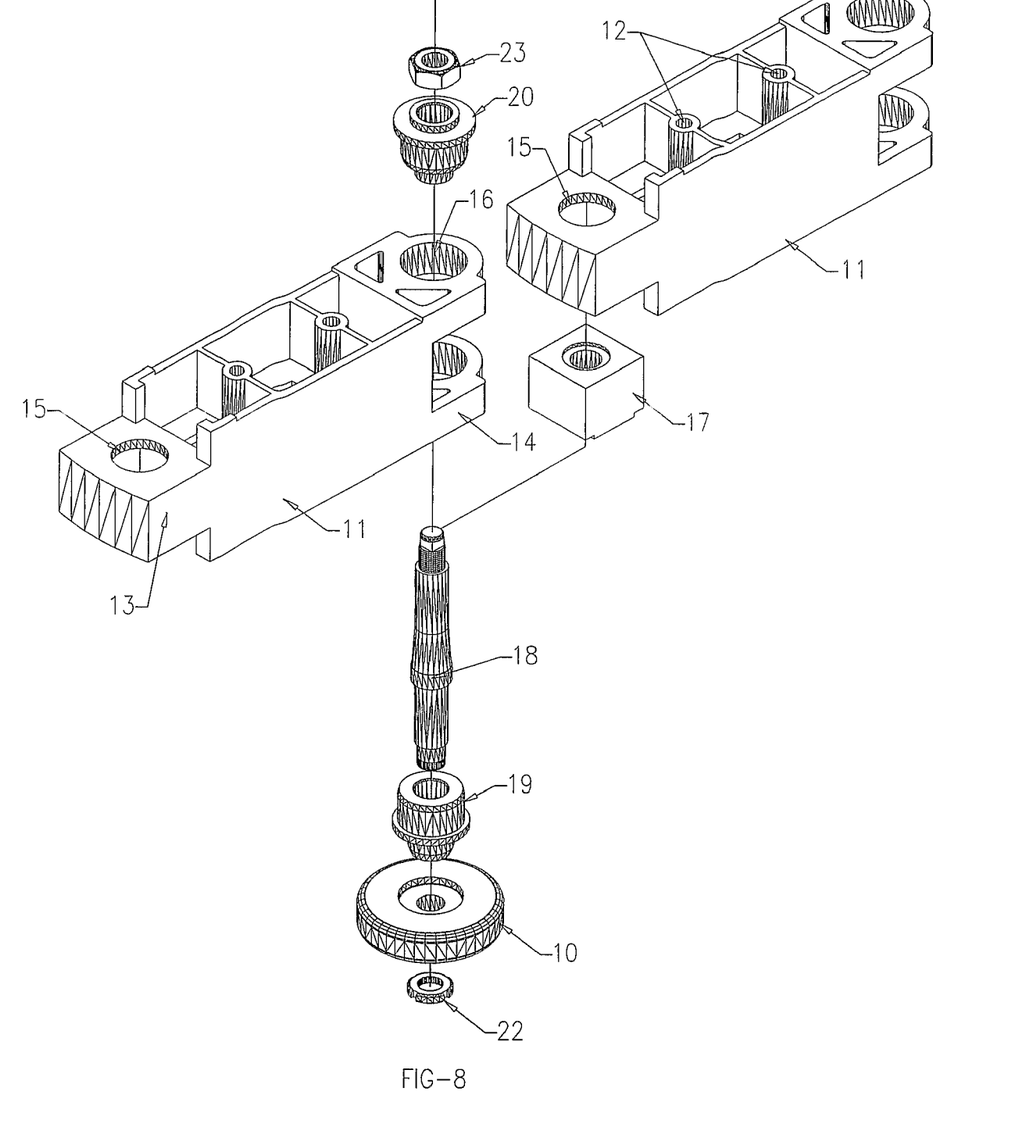
FIG. 8 is an isometric view illustrating the assembly of the 2D curve chain.
Figure 12:
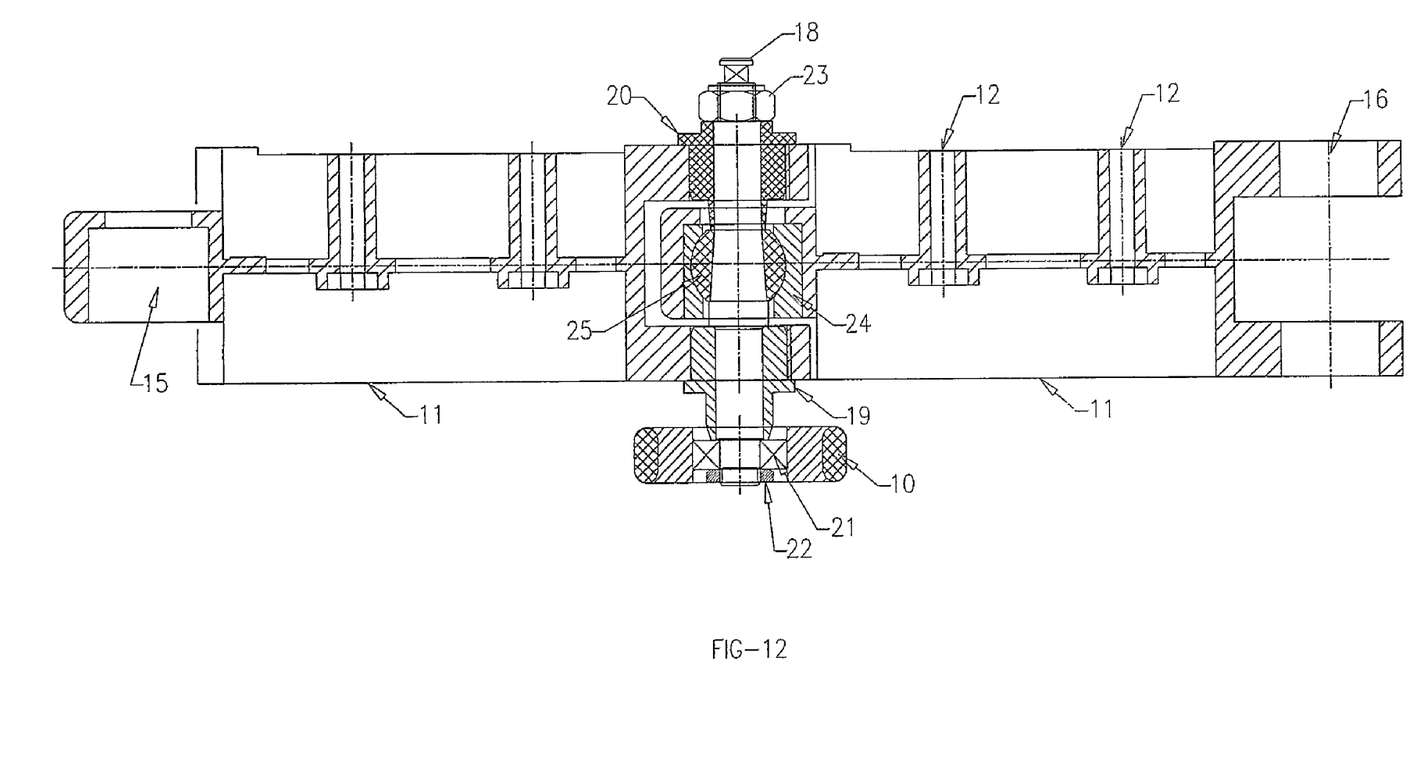
FIG. 12 is a sectional view of the 3-dimensional (3D) curve chain assembly.
Figure 13:
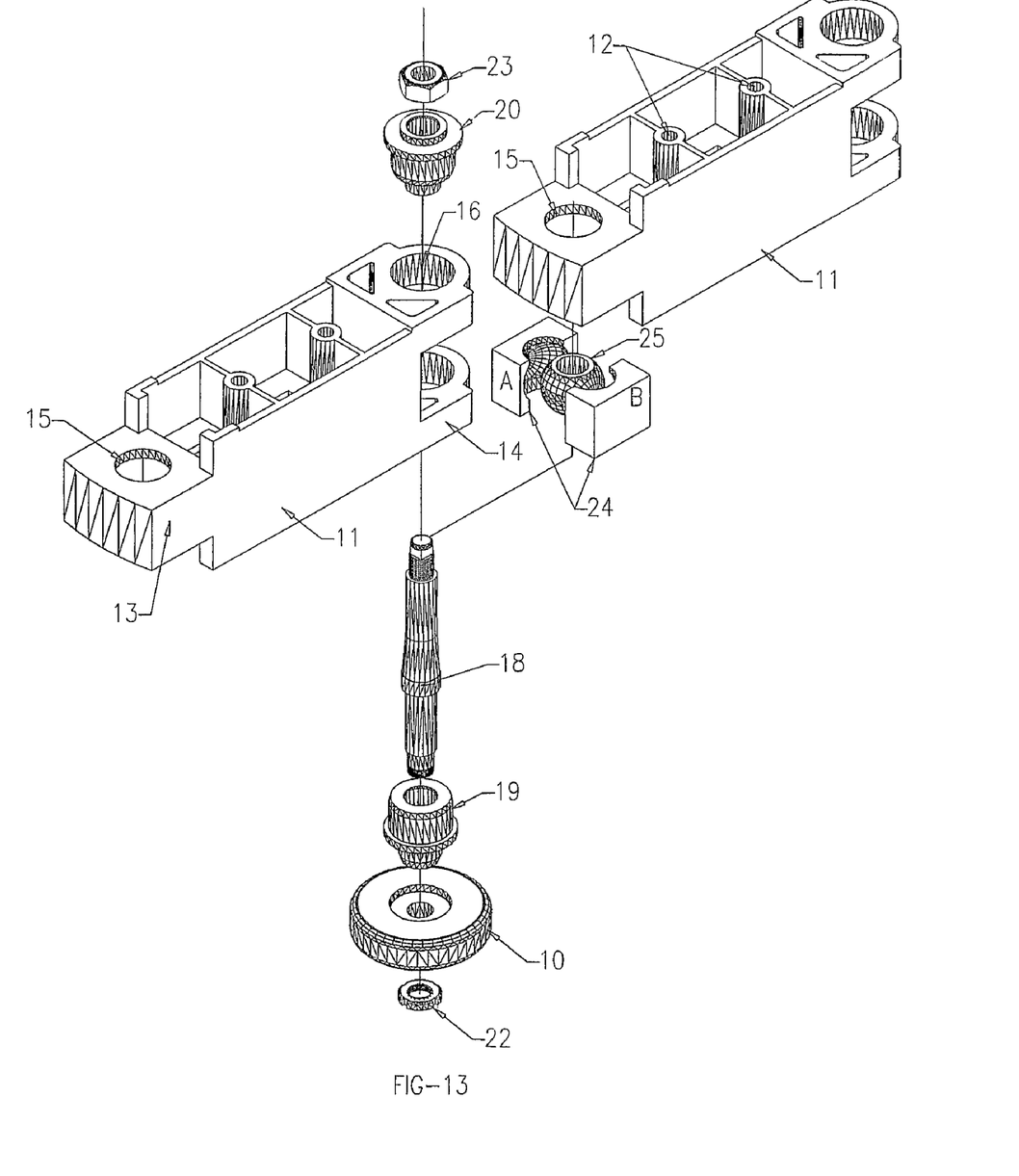
FIG. 13 is an isometric view illustrating the assembly of the 3D curve chain.

FIGS. 7 and 8 shows the components of 2D chain link assembly while FIGS. 12 and 13 shows the components of 3D chain link assembly in more detail. Chain 2 is made up of a series of identical lightweight die-cast aluminum alloy link blocks 11, interlinked by pin assemblies. Each slat support bracket 9 is securely mounted to a respective link block 11 by way of bolts passing through two bolt holes 12 in the block.

Each link block 11 features a first end portion 13 and a second end portion 14, provided with vertical through bores 16 at end portion 14 while end portion 13 is provided with a cavity 15 to accommodate specially designed polyurethane offset middle bushing 17. The first end portion of one link block 11 has a complementary fit with the second end portion of the next link block 11, whilst allowing rotational movement about the vertical axis passing through bores 16 and 15 when aligned. The through bores thus provide the pivot points for the articulation of the links of chain 2 as it follows its curved path around the carousel.

In assembly, each pair of successive link blocks 11 is joined by means of a specially designed vertical pin 18 of mild steel running through aligned through bores 15; 16. Bottom and top polyurethane bushing 19 and 20 provide a low friction bearing for rotation about pin 18. Bottom bushing 19 is retained by guide wheel 10, which is mounted to the narrowed lower extremity of pin 18 via bearing 21 and retained in place by means of locknut 22. Top bushing 20 is retained by way of locknut 23. Facility to hold the pin 18 in place using spanner while tightening the locknut 23 is provided in the pin 18 design for easy assembly of link blocks 11.

Figure 9:
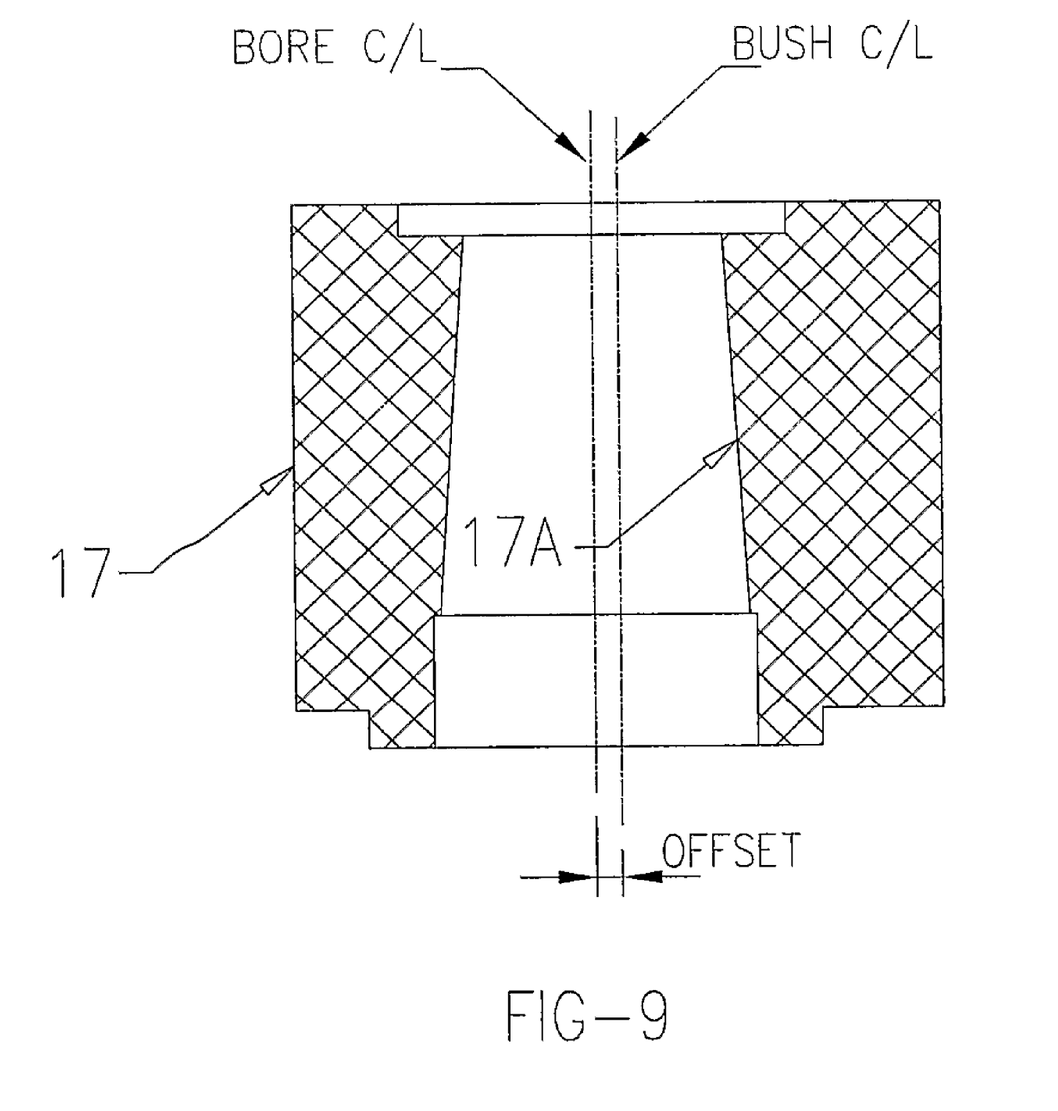
FIG. 9 is sectional view of the middle offset bush for 2D curve chain.

FIG. 9 shows in detail the design of offset middle bushing 17, whose design enables increase or decrease of chain 2 pitches by the offset amount and also simple tensioning of the chain 2 during assembly due to conical bore 17A.

Figure 10:
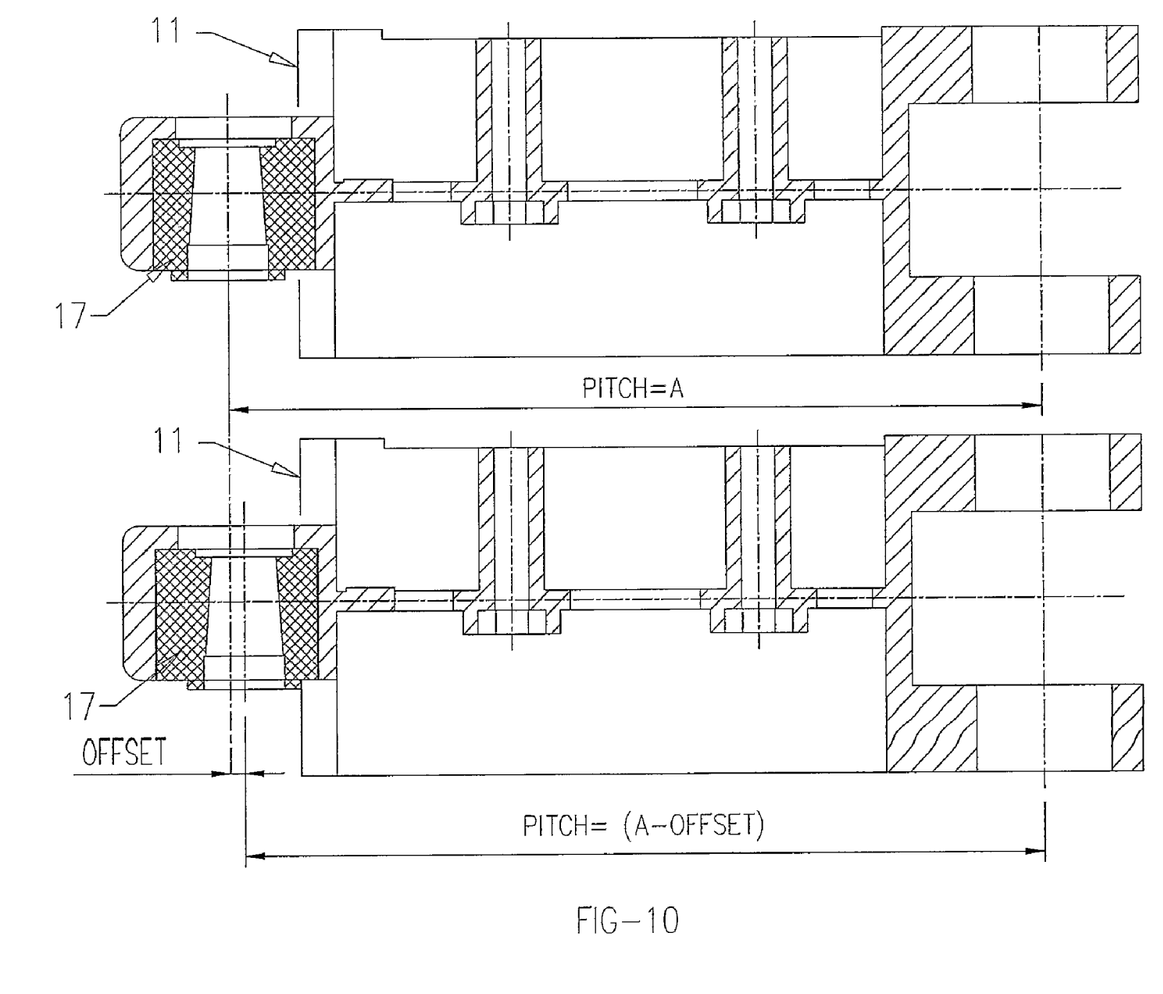
FIG. 10 is an illustration of how to vary the chain pitch.

FIG. 10 shows how the variation in chain pitch length is achieved by simply placing the middle offset bushing 17 in different orientation inside the cavity 15 of the link block 11.

Figure 11:
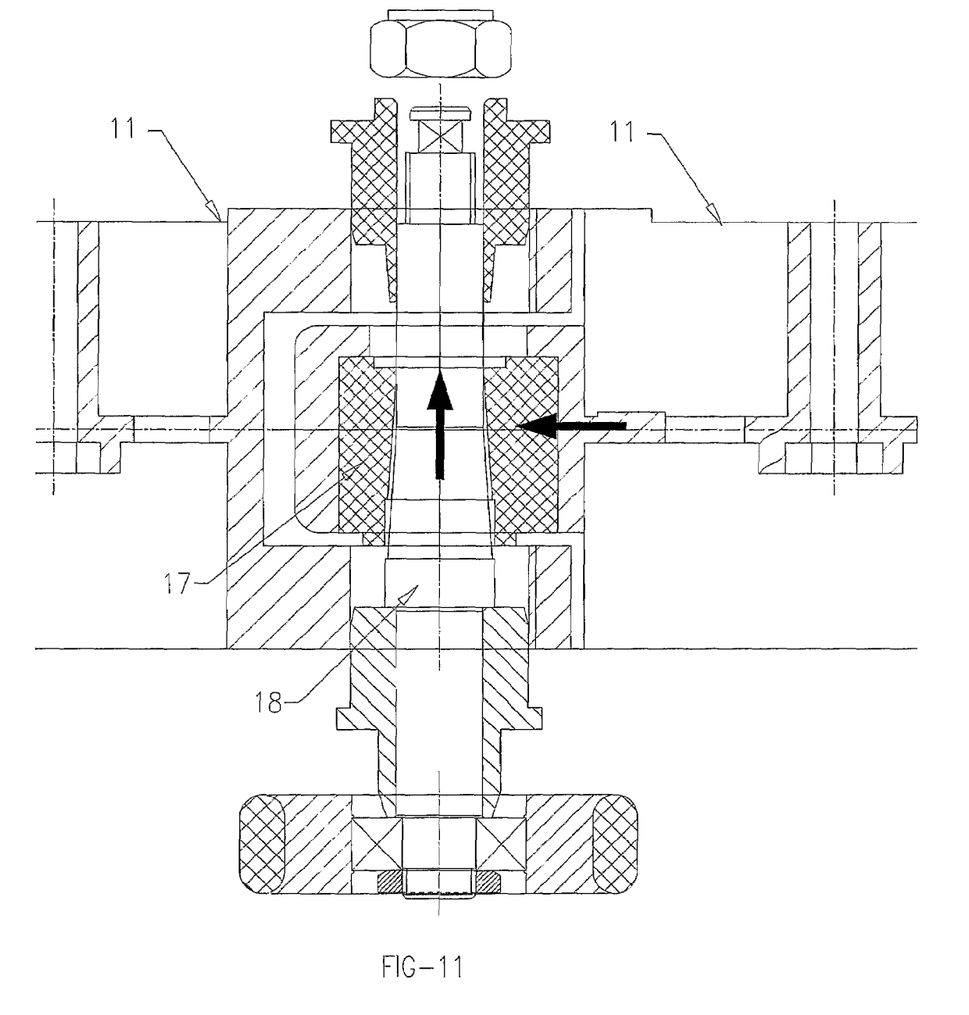
FIG. 11 is an illustration of how to pre-tension the chain is achieved.

FIG. 11 explains the tensioning effect achieved while assembling the link blocks 11 due the engagement of conical surface provided in pin 18 inside the conical bore 17A provided in middle offset bushing 17. As the pin 18 enters the middle offset bushing 17 from below during assembly, the link block 11 with offset bushing 17 whose bore centerline is pulled in to align with the center line of the bore 16 of the other adjacent link block 11. Thus the chain 2 is tensioned after changing the chain pitch to take care of chain elongation problems i.e., the take-up requirement.

The steps to be carried out to adjust the chain pitch are as follows:
1. Loosen and Remove the locknut 23.
2. Pull down the pin 18 along with assembled bottom bushing 19 and guide wheel 10 and release the pin connection.
3. Rotate the released link block 11 sideways to bring the end portion 13 out of chain 2 centreline.
4. Reorient the middle offset bushing inside the cavity 15 of the released link block 11 in order to change the pitch.
5. Rotate back the release link block 11 to bring it in line of chain 2 centreline.
6. Assemble the pin connection by inserting the pin 18 from bottom and locking it with locknut 23. As already explained above, the conical portion of the pin 18 and bushing 17 will provide required tensioning effect on the chain 2.

By way of example, if the set chain pitch (the separation of the centerlines through bores 15 and 16 of the chain block) is 248 mm, and the offset of middle bushing 17 is 2 mm, the actual pitch of a chain block (distance between adjacent pin centerlines) can be adjusted to 250 mm or 246 mm, thus adjusting the overall length of the chain in order to tension it. Multiplied over the length of the chain this provides a sufficient range of adjustment to take into account installation tolerance, initial tensioning, and all adjustments needed to allow for elongation during the design life of the chain. Chain tensioning is rarely required due to the low wear of the assembly, and can be done easily as explained above.

From the FIGS. 7 to 11, the chain assembly described is for a 2 dimensional (2D) curve chains since rotational movement is restricted about the vertical axis along the pin 18 centerline passing the link block bores 15 & 16 thus allowing articulation of the links of chain 2 as it follows the curved paths around the carousel 1 for horizontal curves only. However, for multi level overlapping slat conveyor/carousel 1, this chain has to negotiate the vertical curves also in addition to horizontal curves. So, this chain has to be converted to 3 dimensional (3D) curve chain by replacing the middle offset bushing 17 with a specially designed middle offset bushing 24 incorporated with spherical ball 25 arrangement to get multi directional movements as shown in FIGS. 12 and 13.

The middle offset bushing 24 containing parts A & B will joined incorporating the spherical ball 25 at center and then inserted inside the cavity 15 of the link block 11. Using this link block 11 along with middle bushing 24, the chain 2 will be assembled similar to that already explained above.

FIGS. 12 shows the details of the assembled pin for 3D curve chains and FIG. 13 shows the exploded view of the 3D curve chain. Sufficient gap all around the chain end 13 and 14 while engaged with pin assembly is created for articulation in all directions. This is achieved by holding the link blocks 11 in position by the support slat 3 and load wheels 8 and also by following tight fit between cavity 15 and middle offset bushing 24.

Figure 14:
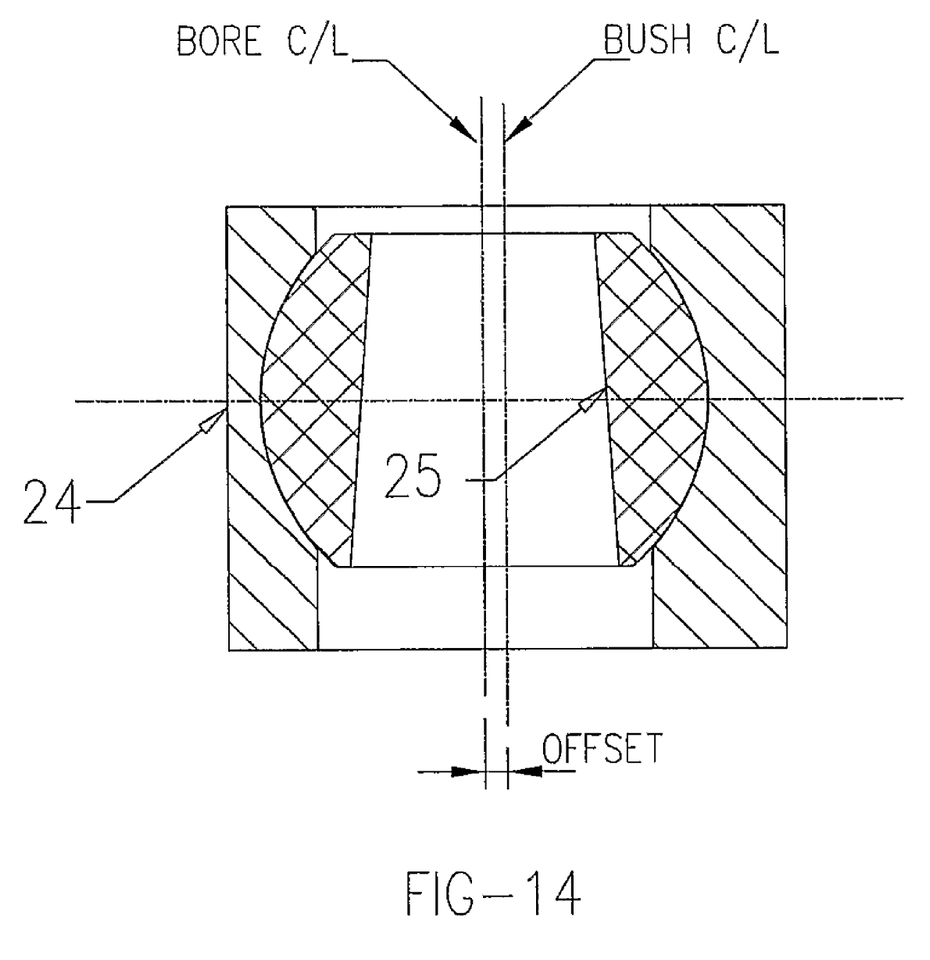
FIG. 14 is sectional view of the middle offset bush for 3D curve chain.

FIG. 14 shows in detail the design of 3D offset middle bushing 24, whose design enables (i) increase or decrease of chain 2 pitches by the offset amount, (ii) simple tensioning of the chain 2 during assembly due to conical bore inside the spherical ball 25 and (iii) multi directional relative movement between bushing 24 and spherical ball 25.

The centerline of 3D offset block 24 and the centerline of spherical ball bore are assembled with offset in order to increase or decrease chain pitch similar to that envisaged in 2D chain as shown in FIG. 10. The conical bore of spherical ball 25 will engage with that provided in pin 18 during the assembly in order to get tensioning effect on the link chains as explained above for 2D chain shown in FIG. 11. Thus the chain 2 is tensioned after changing the chain pitch to take care of chain elongation problems i.e., the take-up requirement.

Figures 15A, 15B:
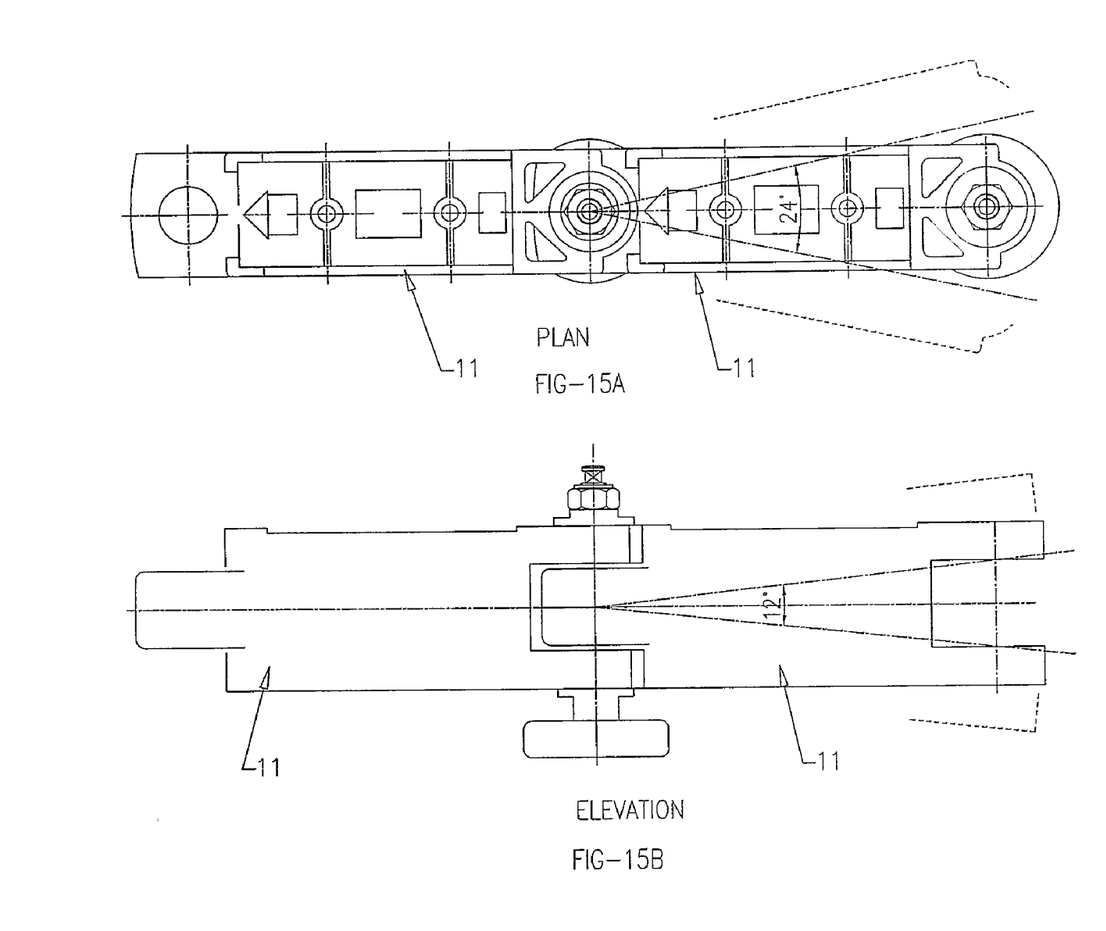
FIG. 15 is illustration of extend of 3D curve chain movements in multi directions.
Figure 15C:
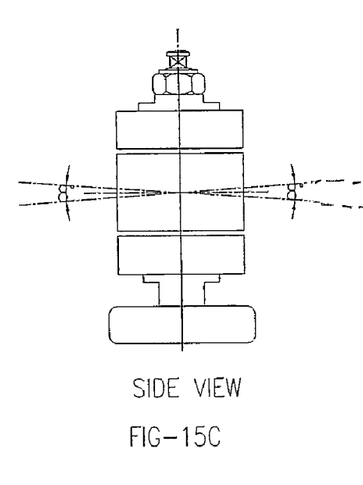

FIG. 15A-C shows the limitation in the articulation of the link blocks 11 in the 3D curve chain assembly which are restricted by the block design. In order to operate the chain within this restricted articulation, the layout of the carousel loop shall be developed considering the minimum radius of curvatures to be adopted for various curves.

By way of example, if the set chain pitch is 248 mm+/−2 mm, the restricted included angle for horizontal curves articulation is 24° and the vertical curves articulation is 12° and lateral twist articulation is 8° as shown in FIG. 15A-C which works out to minimum radius of curvatures for horizontal @ 1,200 mm and for vertical @ 2,400 mm.

The materials used in the block chain arrangement provide a robust assembly with low weight, requiring minimal maintenance, producing minimal operation noise, and allowing simple pitch adjustment as described above. The large aluminum link blocks 11 of chain 2 are very robust, and the design of the chain eliminates the need for lubrication as the movement of parts is between polyurethane and aluminum materials.

Although the present invention has been described in detail with respect to the illustrated embodiments, it should be understood that various changes, substitutions and alterations can be made thereto without departing from the spirit and scope of the invention as defined by the appended claims.

The invention claimed is:

1. A conveyor system comprising
a link assembly, said link assembly comprising:
a first link block having a first bore at one end thereof;
said first bore including a first pin therethrough;
said first link block having a second pin at another end thereof, said second pin being parallel to said first pin;
a first offset bushing coupled to the first pin, but not extending through said first bore; and
a second link block coupled to the first offset bushing, the second link block movable with respect to the first link block upon rotation of the first offset bushing with respect to the second link block.

2. The system as claimed in claim 1 further comprising:
a plurality of pins;
a plurality of offset bushings coupled to the plurality of pins;
a plurality of link blocks, each coupled to one of said offset bushings at one end and coupled to one of said pins at another end;
the first link block connected to one of the plurality of link blocks by one of the first pin, the second pin, and the plurality of pins;
the second link block connected to one of the plurality of link blocks by one of the first pin, the second pin, and the plurality of offset bushings to form at least one of a two dimensional curve chain assembly, a three dimensional curve chain assembly, and a combination thereof, said one of the plurality of offset bushings allowing tensioning control of the conveyor system.

3. The system as claimed in claim 2 wherein:
the first offset bushing has a conical surface provided therein; and
the first pin has a conical surface provided thereon for engaging with the conical surface to move the first link block relative to the second link block.

4. The system as claimed in claim 1 further comprising:
a spherical ball bushing coupled to the first pin; and
the first offset bushing having a spherical opening associated therewith for coupling to the spherical ball bushing for multi-directional movement of the first link block relative to the second link block.

5. The system as claimed in claim 1 further comprising:
bushings in the second link block for supporting the first pin;
a spherical ball bushing coupled to the first pin; and
the first offset bushing having a spherical opening provided therein for coupling to the spherical ball bushing for multi-directional movement of the first link block relative to the second link block.

6. The system as claimed in claim 1 further comprising:
a spherical ball bushing coupled to the first pin; and
the first offset bushing having a spherical opening provided therein, the first offset bushing not requiring lubrication for movement of the spherical ball bushing or for movement with respect to the second link block.

7. The system is claimed in claim 1 further comprising:
a guide wheel associated with the first pin and
a raceway for guiding the guide wheel in movement of at least two dimensional, three dimensional, and a combination of two and three dimensional directions.

8. The system as claimed in claim 1 further comprising:
a slat; and
connectors for connecting the slat to the first link block in a fixed position relative thereto.

9. The system as claimed in claim 1 further comprising:
a slat;
a slat support member having a wheel;
connectors for connecting the slat to the slat support member and to the first link block; and
a raceway for guiding the wheel movement in one of at least two dimensional, three dimensional, and a combination of two and three dimensional directions.

10. The system as claimed in claim 1 further comprising:
a slat;
a guide wheel associated with the first pin, the first pin at an angle to the slat; and
connectors for connecting the slat to the first link block in a fixed position relative thereto.

* * * * *